United States Patent [19]

Krampe

[11] Patent Number: 4,667,406
[45] Date of Patent: May 26, 1987

[54] CABLE END STRIPPING DEVICE

[76] Inventor: Franz Krampe, Bergstrasse 5, D-4715 Ascheberg-Herbern, Fed. Rep. of Germany

[21] Appl. No.: 723,744

[22] Filed: Apr. 16, 1985

[51] Int. Cl.⁴ .................................................. B21F 13/00
[52] U.S. Cl. ........................................... 30/91.2; 30/901
[58] Field of Search ...................... 30/90.1, 91.1, 91.2, 30/90.6, 90.7, 90.8, 90.4

[56] References Cited

U.S. PATENT DOCUMENTS

| | | | |
|---|---|---|---|
| 3,151,510 | 10/1964 | Burkes et al. | 30/91.1 X |
| 3,530,575 | 9/1970 | Riche | 30/91.2 |
| 3,796,115 | 3/1974 | Dane | 30/91.2 X |
| 3,914,864 | 10/1975 | Prince | 30/91.2 X |

FOREIGN PATENT DOCUMENTS 3002302  8/1980  Fed. Rep. of Germany .

Primary Examiner—E. R. Kazenske
Assistant Examiner—Willmon Fridie, Jr.
Attorney, Agent, or Firm—Felfe & Lynch

[57] ABSTRACT

A cable end stripping device, wherein one stripping cutter provided with at least one notch is each disposed at the active side of a pair of gripping legs adapted to be moved toward each other by pressure applied to their active ends; the stripping cutters are spaced from each other in the cutting position such that a minimum clearance exists between the cutters; and the gripping legs are joined to a handle portion at the end opposite from the active side, wherein the handle portion (1) has a laterally open U-shaped section or profile which has the gripping legs (2, 2') fixed to the opposing inner faces thereof.

4 Claims, 3 Drawing Figures

CABLE END STRIPPING DEVICE

The present invention relates to a cable end stripping device, wherein one stripping cutter provided with at least one notch is each disposed at the active side of a pair of gripping legs adapted to be moved toward each other by pressure applied to their active ends; the stripping cutters are spaced from each other in the cutting position such that a minimum clearance exists between the cutters; and the gripping legs are joined to a handle portion at the end opposite from the active side.

DE-OS (laid-open German patent application) No. 30 02 302 shows to be known a cable end stripping device having a substantially closed handle portion. In this device, the handle portion material at the front active end has punched out therefrom tongues which are pressed against a pair of stripping and cutting arms when stripping (the insulation) of a cable end. The resilient tongues are automatically returned to their initial position when pressure is released.

The stripping and cutting arms of the device which support the stripping cutters (cutting edges) are positioned in an opening at the front end of the handle portion. This opening is closed at the rear end of the cutting arms such that only cable ends of a limited length can be inserted between the arms. In the practical use of the stripping device (or tool), however, it is frequently necessary to strip the thick outer sheath of long cable ends.

It is therefore the object of the present invention to provide a stripping device (or tool) which permits stripping without any problem even long cable ends. Further, it should be made sure that the cable ends are securely held in the device.

In a stripping device according to the invention, this object is solved in that the handle portion has a laterally open U-shaped section or profile which has the gripping legs fixed to the opposing inner faces thereof.

According to the invention, long ends of even thick cables may be placed into the U-section of the stripping device. The length of a cable end is not limited by the construction of the device, because the U-section of the handle portion defines substantially a continuous channel for the cable end. Thus, a cable end can be placed or inserted into the U-section without impeding the access to the cutting position.

In order to provide for a secure hold for an inserted cable in the device, which is of importance for a proper cut, the gripping legs include at least on the portion extending toward the cutting side, a longitudinal guide path for a cable placed into the U-section. A particularly simple longitudinal guide path for the cable is provided when the gripping legs have an approximately V-shaped section or profile in the longitudinal guide path.

Further, in order to obtain a proper cut, it is contemplated that the aperture angle of the notches formed in the stripping cutters is smaller than the aperture angle of the V-shaped longitudinal guide path.

The problem which occurs in the case of long cable ends, namely that the insulating sheath is difficult to be stripped off after the severing thereof, can be solved in easy manner in the stripping device according to the invention by pressing or gripping jaws at the active ends of the gripping legs, the lateral faces of which jaws are proveded with recesses which, with the gripping jaws pressed together, define a cable passage having disposed therein a cutting pin or punch for longitudinally slitting the cable sheath.

Preferably, the pressing or gripping jaws include at least one guide path which is associated with one notch in the stripping cutters for smaller cable diameters, and which extends in parallel with the gripping legs.

In the stripping device according to the invention, a cable end to be stripped is engaged and held by the cutters of the gripping legs when these legs are moved toward each other under pressure. Cutting into the insulating sheath of the cable is effected by rotating the device, whereby the cutters (or cutting edges) of the notches sever the insulating sheath. Owing to the depth of the notch, an excessively deep cut is avoided which could damage the metal conductor. Thin (small-diamter) cables, too, may be stripped in the notch. Suprisingly, the cutting action can be well controlled by the direct depressing operation of the cutting ends of the gripping legs, and crushing of the metal conductor during stripping can be avoided. The gripping legs of the stripping device are returned from the cutting position to the initial (or rest) position by spring pressure.

Apparently, the stripping device according to the invention is of uncomplicated and convenient structure, and since the device is well conformed to the requirements of practice, it may be spoken of an excellent solution to the existing problems.

In exemplary embodiment of the invention is illustrated in the drawing and decribed in detail below. In the drawing.

Figure 1:
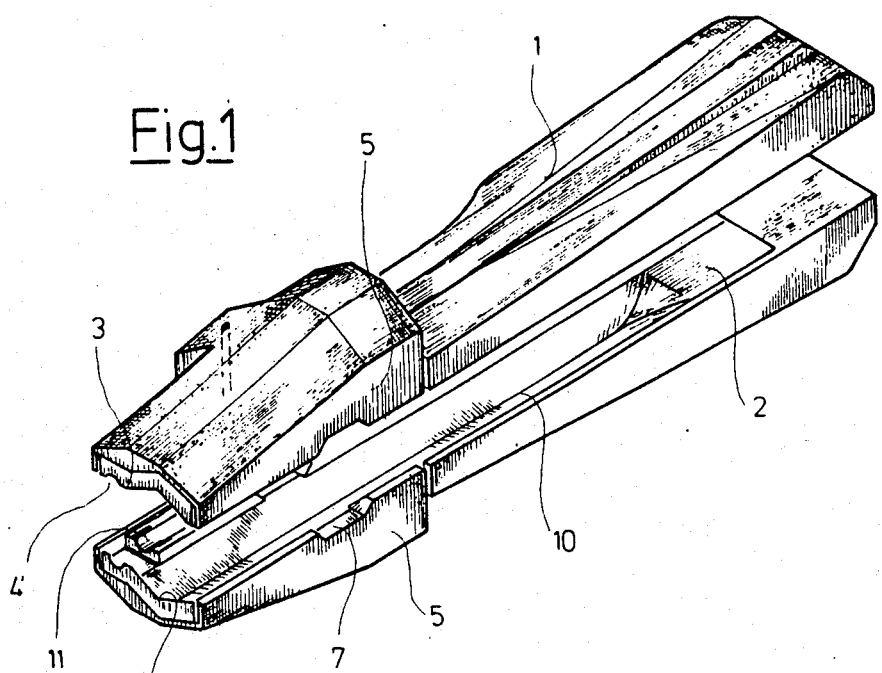
FIG. 1 is a perspective view of a stripping device (or tool) according to the invention.
Figure 2:
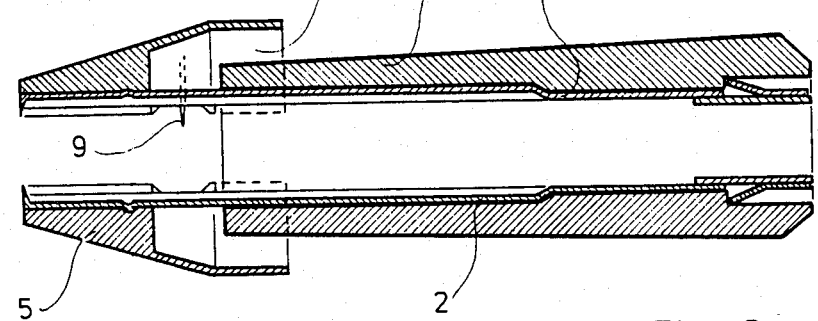
FIG. 2 is a longitudinal sectional view of the device according to FIG. 1.
Figure 3:
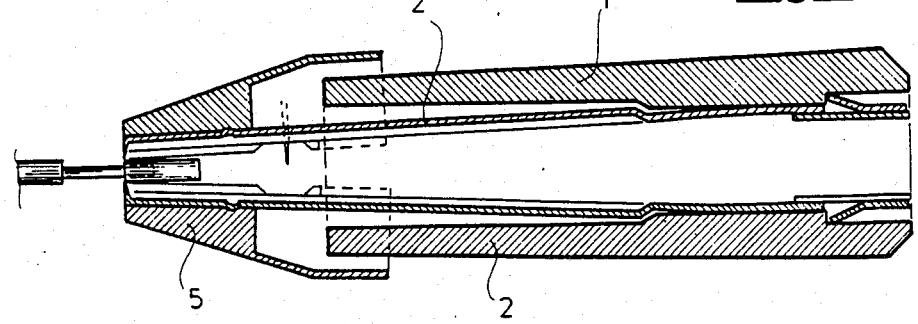
FIG. 3 is a longitudinal sectional view of the device in its cutting position or state.

As shwon in the Figures, a cable end stripping device according to the invention comprises essentially gripping legs 2 and 2' joined to a handle portion 1 and including at their cutting end, a cutter 3 having notches 4 and 4', as well as pressing or gripping jaws 5 at the cutting ends of the legs 2 and 2'.

The handle portion 1 of the stripping device has a U-shaped section the opening of which is directed toward the one side of the handle portion. The side face opposite from the opening of the U-section may be conformed to the user's hand so that the tool is easy and comfortable to hold. The inner sides of the legs of the U-section have each joined thereto the ends of the gripping legs 2 and 2' remote from the cutting side. The gripping legs 2 and 2' comprise a strip section of spring steel and are adapted to be moved toward each other against their own spring force (resilience) when applying pressure to the jaws 5. In the initial position, the gripping legs 2 and 2' contact the inner side of the U-section of the handle portion. The U-section of the handle portion 1 defines in combination with the gripping legs 2 and 2' a longitudinal passage through the tool, into which passage long cable ends may be inserted without any problem so as not to disturb the stripping operation.

The front part of the gripping legs 2 and 2' facing the cutting side is formed as a V-shaped channel 10 which acts as a cable guide path and which, with the gripping legs pressed against each other, provides for holding an inserted cable against slip.

The cutting ends of the gripping legs 2 and 2' have each formed integrally therewith stripping cutters (cutting edges) 3 facing each other in inward direction. Each cutter 3 includes two notches of different depth, i.e. a deep angular notch 4 for the outer sheath of a cable, and a smaller, approximately semicircular notch 4' for the sheath of smaller-diameter cable strands.

The insulating sheath of a cable grasped or held between the cutters 3 by pressure applied to the jaws 5 is circularly cut or notched and cut through or severed by the ground edges of the notches 4 and 4' when the stripping device is rotated. Owing to the depth of the notches, the insulation may be cut through while avoiding damage to a metallic conductor or to the interior cable strands when stripping an outer protective sheath, respectively, the depth of the notches 4 and 4' is chosen so as to be approximately equal to the thickness of the protective sheath of a multi-conductor cable or to the thickness of the insulation of separate thin cable strands, respectively.

Furthermore, critical for proper cutting is that the aperture angle of the notch 4 is smaller than the aperture angle of the V-shaped longitudinal channel 10 in the gripping legs 2 and 2'. For example, the angle of the notch 4 may be 120°, and the angle of the channel 10 may be of the order of 140°.

The pressing or gripping jaws 5 of the stripping device comprise shaped (molded) parts formed similar to the handle end of combination pliers. Preferably, the gripping jaws 5 are formed from a plastics material and may have their upper sides shaped such that a suitable engagement area is defined for the thumb or index finger of the hand applied for depressing the gripping jaws. In the vicinity of the cutting end, the gripping legs 2 and 2' are enclosed by the gripping jaws 5, with the terminal edges of the side faces of the gripping jaws 5 projecting slightly beyond the cutters 3 such that, when the gripping jaws 5 are pressed against each other, a minimum clearance is left between the cutters (cutting edges) 3 to prevent the cutters from contacting each other.

The gripping jaws 5 partly overlap the handle portion 1, thereby providing a handy length of the stripping device. Corresponding openings 6 in the gripping jaws ensure that movement of the gripping legs 2 is not impeded thereby.

Spaced from the cutters 3, the side faces of the gripping jaws 5, which project beyond the gripping legs 2 and 2', include recesses 7 on opposite sides each. With the qripping jaws 5 pressed against each other, the recesses 7 define a lateral passage into which a cable may be placed while avoiding crushing thereof. The passage has disposed therein a cutting pin or punch 9 by means of which the protective sheath of a cable clamped within the passage may be slit open in the longitudinal direction.

Further, the stripping device includes a channel-shaped guide path 11 for small-diameter cables in addition to that for thick cables, which guide path extends behind the notch 4' in the side wall portion of the gripping jaws 5 in parallel with the gripping legs 2 and 2'.

I claim:

1. A cable end stripping device comprising:
    a pair of gripping legs having active sides and having active ends and adapted to be moved toward each other by pressure applied to said active ends;
    a pair of stripping cutters each with at least one notch disposed at each of said active ends of said pair of resilient gripping legs, said stripping cutters being spaced from each other in the cutting position such that a minimum clearance exists between said cutters;
    said stripping cutters comprising gripping jaws at said active ends of said gripping legs, the side faces of said jaws having recesses which, when said gripping jaws are pressed together, define a lateral cable passage, and cutting means disposed in said lateral cable passage for longitudinally opening a cable sheath; and
    a handle portion having a base portion and a pair of side portions extending perpendicular thereto and forming a laterally open U-shaped cross section, one of said pair of gripping legs secured to each of said side portions of said handle portion at an end opposite to said active ends, said handle portion and said gripping legs defining a longitudinal cable guide path for the insertion of a cable end.

2. The stripping device according to claim 1 in which said longitudinal guide path of said gripping legs has an approximately V-shaped profile.

3. The stripping device according to claim 2, in which said at least one notch has an aperture angle which is smaller than the aperture angle of the V-shaped longitudinal guide path.

4. The stripping device according to claim 1, in which said stripping cutters each include one notch for smaller cable diameters and in which said gripping jaws include at least one guide path which is associated with said one notch in each of said stripping cutters for smaller cable diameters.

* * * * *